United States Patent
Ross et al.

(10) Patent No.: US 11,172,374 B1
(45) Date of Patent: Nov. 9, 2021

(54) SYSTEMS AND METHODS FOR BUILDING AND FUNDING COMMUNICATION NETWORKS

(71) Applicants: Kevin Ross, Lehi, UT (US); Muhammad Ahsan Naim, South Jordan, UT (US)

(72) Inventors: Kevin Ross, Lehi, UT (US); Muhammad Ahsan Naim, South Jordan, UT (US)

( * ) Notice: Subject to any disclaimer, the term of this patent is extended or adjusted under 35 U.S.C. 154(b) by 0 days.

(21) Appl. No.: 16/660,532

(22) Filed: Oct. 22, 2019

Related U.S. Application Data

(60) Provisional application No. 62/807,158, filed on Feb. 18, 2019, provisional application No. 62/787,641, filed on Jan. 2, 2019, provisional application No. 62/784,071, filed on Dec. 21, 2018, provisional application No. 62/749,090, filed on Oct. 22, 2018.

(51) Int. Cl.

| | | |
|---|---|---|
| *H04W 16/18* | (2009.01) | |
| *H04L 29/08* | (2006.01) | |
| *G06Q 20/36* | (2012.01) | |
| *H04W 84/18* | (2009.01) | |

(52) U.S. Cl.
CPC ........ *H04W 16/18* (2013.01); *G06Q 20/3678* (2013.01); *H04L 67/1097* (2013.01); *G06Q 2220/00* (2013.01); *H04W 84/18* (2013.01)

(58) Field of Classification Search
CPC .. H04W 16/18; H04W 84/18; H04L 67/1097; G06Q 20/3678; G06Q 2220/00
USPC ........................................................ 455/446
See application file for complete search history.

(56) References Cited

U.S. PATENT DOCUMENTS

| | | | |
|---|---|---|---|
| 6,553,218 B1 * | 4/2003 | Boesjes | H04L 12/2856 |
| | | | 455/406 |
| 8,385,921 B1 | 2/2013 | Shousterman et al. | |
| 8,406,126 B1 | 3/2013 | Leiba et al. | |
| 9,425,985 B1 | 8/2016 | Shousterman et al. | |
| 9,538,331 B2 | 1/2017 | Ross et al. | |
| 9,621,465 B2 | 4/2017 | Ross | |
| 9,860,179 B2 | 1/2018 | Ross | |
| 9,942,776 B2 | 4/2018 | Ross et al. | |
| 9,973,939 B2 | 5/2018 | Ross | |
| 10,027,508 B2 | 7/2018 | Leiba et al. | |
| D856,962 S | 8/2019 | Hart et al. | |
| 10,530,851 B1 | 1/2020 | Hart | |
| 10,530,882 B2 | 1/2020 | Ross | |

(Continued)

FOREIGN PATENT DOCUMENTS

WO 2018083548 A1 5/2018

OTHER PUBLICATIONS

Benjamin Leiding/Parisa Memarmoshrefi/Dieter Hogrefe, Self-managed and Blockchain-based Vehicular Ad-hoc Networks, Sep. 12-16, 2016, pp. 137-140 (Year: 2016).*

*Primary Examiner* — Farid Seyedvosoghi
(74) *Attorney, Agent, or Firm* — Lee Sullivan Shea & Smith LLP

(57) ABSTRACT

Disclosed herein is a next generation communication system comprising a set of network nodes that are interconnected into a wireless mesh network, where a subset of the network nodes in the set are further coupled to a blockchain network that is configured to provide blockchain-based services, such as blockchain-based distributed data storage or a service for blockchain-based digital cryptocurrency mining.

19 Claims, 7 Drawing Sheets

(56) References Cited

U.S. PATENT DOCUMENTS

2014/0057570 A1    2/2014  Leiba
2015/0358082 A1   12/2015  Ross
2018/0331935 A1   11/2018  Ross et al.
2018/0343685 A1*  11/2018  Hart .................... H04W 24/02
2019/0334700 A1*  10/2019  Callan ................. H04L 9/0643

* cited by examiner

SYSTEMS AND METHODS FOR BUILDING AND FUNDING COMMUNICATION NETWORKS

CROSS-REFERENCE TO RELATED APPLICATIONS

This application claims priority to (i) U.S. Provisional App. No. 62/749,090, filed Oct. 22, 2018, and entitled "METHOD FOR FUNDING WIRELESS NETWORK ROLL-OUT," (ii) U.S. Provisional App. No. 62/784,071, filed Dec. 21, 2018, and entitled "METHODS FOR FUNDING NEXT GENERATION WIRELESS NETWORK ROLL-OUT," (iii) U.S. Provisional App. No. 62/787,641, filed Jan. 2, 2019, and entitled "METHOD FOR BUILDING WIRELESS MESH NETWORK WITH CONSUMER FINANCING," and (iv) U.S. Provisional App. No. 62/807,158, filed Feb. 18, 2019, and entitled "METHODS FOR FUNDING NEXT GENERATION WIRELESS NETWORK ROLL-OUT," each of which is incorporated herein by reference in its entirety. Additionally, this application also claims priority to (v) U.S. Provisional App. No. 62/753,885, filed Oct. 31, 2018, and entitled "METHODS OF BUILDING 60GHZ MESH BASED NETWORK INFRASTRUCTURE FOR BLOCKCHAIN TECHNOLOGY BASED PLATFORMS."

BACKGROUND

Next generation communication networks (e.g., 5G/6G/7G+ communication networks) may give rise to new challenges and new opportunities relative to previous generation communication networks. For instance, one way a 5G communication network differs from previous generation communication networks is the use of a high frequency millimeter wave spectrum where signals carrying information propagate only to short distances. Hence, for example, in sub-urban regions where a single cell tower using 2G/3G/4G technology can easily cover multiple tens of square miles area now require hundreds or thousands of small cells to cover same area with 5G millimeter spectrum based wireless network.

Moreover, current 5G communication network design approaches typically rely on deploying small cells on street objects that may give rise to zoning/permitting issues that make the 5G network roll-out very slow. In addition, a large sum of money is paid by a wireless operator to local municipalities for each site, which makes covering large cities/metros prohibitively expensive.

Some other 5G communication network design approaches rely on deploying 5G small cells on private infrastructure such as single-family homes. This approach reduces the overall cost (e.g., by eliminating the cost to local municipalities) but still requires large capital expenditure ("CapEx") due to the need for deployment of large number of sites to cover an entire geographic region (e.g., a city/county or an entire metroplex).

Thus, there exists multiple needs in the art for improved methods and approaches to fund, deploy, and/or operate next generation communication networks (e.g., 5G/6G/7G+ communication networks).

OVERVIEW

In one aspect, disclosed herein are systems and methods that relate to funding a next generation communication network (e.g., a 5G/6G/7G+ communication network) that requires large CapEx to cover a large geographical region. Generally speaking, high-speed internet provided by a next generation communication network represents a type of private service with a huge market and typically requires low/medium equipment/installation cost and modest upfront sales commission. There are other types of private utilities and/or services (referred to herein collectively using the term "services" for simplicity) such as home security and solar energy that require a large upfront sales commission and expensive equipment and installation fees due to its small to medium market size and comparatively difficult sales to high-speed internet.

In one implementation, the systems and methods proposed in the current disclosure may exploit the synergies of two or more types of private services by bundling them together. For instance, private services (including home security, solar energy, etc.) providers can leverage a large high-speed internet service market and increase their market size by bundling their service with high speed internet provided by an operator of a next generation network at the cost of giving their upfront sales commission to the network operator. In this respect, the network operator can make profit with each bundled sale and can in turn use the sales commission to fund its next-generation network deployment and/or for unbundled high-speed internet service sales.

In another implementation, one or more wireless communication nodes of a next generation communication (e.g., a 5G/6G/7G+ communication network) network may include a blockchain node by hosting a computer comprising a processor(s), memory, digital content, software, etc., which is connected to a blockchain network using a client capable of storing, validating, and/or relaying transactions. This enables the next generation communication network and its nodes to provide an ideal platform for blockchain databases, file/data/record storage space, blockchain-based digital cryptocurrency mining, including cloud mining, pool mining, blockchain-based distributed data storage nodes by adding dedicated or shared storage capacity capability etc. In some instances, the revenue generated from blockchain platform-based applications running on a distributed network of processors and/or computers hosted by a node of a next generation communication network can be used to provide price subsidies to existing and/or new customers of the next generation communication network.

In yet another implementation, social marketing-based methods may be used to organize a certain event. Different marketing strategies, including but not limited to social media, targeted social media, radio/tv, search engine optimization based online marketing, etc., can be used for marketing of the event. For instance, during an event, certain marketing techniques such as online/social media marketing, influencer marketing overview is given to an audience for marketing of communication network services and a detailed marketing guide package is offered at a certain price. Revenue from people who purchase the package may be used to help construction of network node sites, which may cover the cost of the wireless communication equipment and labor charges for installation. Price of the marketing guide package may be set such that revenue from each marketing package sale covers the total cost of adding at least one new network node (e.g., a wireless mesh network node) to the communication network of the operator. With this approach, each package buyer may become a virtual owner of one or more network nodes of a communication network. The social media/influencer marketing package purchasers may be guaranteed a fixed monthly compensation in return for a certain minimum number of posts per day on social media and online for influencer marketing. Package purchasers may also get a fixed amount of compensation plus a small monthly compensation each time their social media/influencer marketing-based posts generate leads that become subscribers of an internet service offered by a network operator organizing and sponsoring the event.

The foregoing has outlined rather broadly the features and technical advantages of examples according to this disclosure so that the following detailed description may be better understood. Additional features and advantages will be described below. It should be understood that the specific examples disclosed herein may be readily utilized as a basis for modifying or designing other structures for carrying out the same operations disclosed herein. Characteristics of the concepts disclosed herein including their organization and method of operation together with associated advantages will be better understood from the following description when considered in connection with the accompanying figures. It should be understood that the figures are provided for the purpose of illustration and description only.

Accordingly, in one aspect, disclosed herein is a next generation communication system comprising a set of network nodes that are interconnected into a wireless mesh network, where a subset of the network nodes in the set are further coupled to a blockchain network that is configured to provide blockchain-based services.

One of ordinary skill in the art will appreciate these as well as numerous other aspects in reading the following disclosure.

BRIEF DESCRIPTION OF THE DRAWINGS

A further understanding of the nature and advantages the present disclosure may be realized by reference to the following drawings.

DETAILED DESCRIPTION

In one aspect, disclosed herein are systems and methods that relate to funding a next generation communication network (e.g., a 5G/6G/7G+ communication network) that requires large CapEx to cover a large geographical region. In accordance with the present disclosure, private services may take various forms and these services may be bundled in various manners to exploit the mutual synergies between the two.

Figure 1:
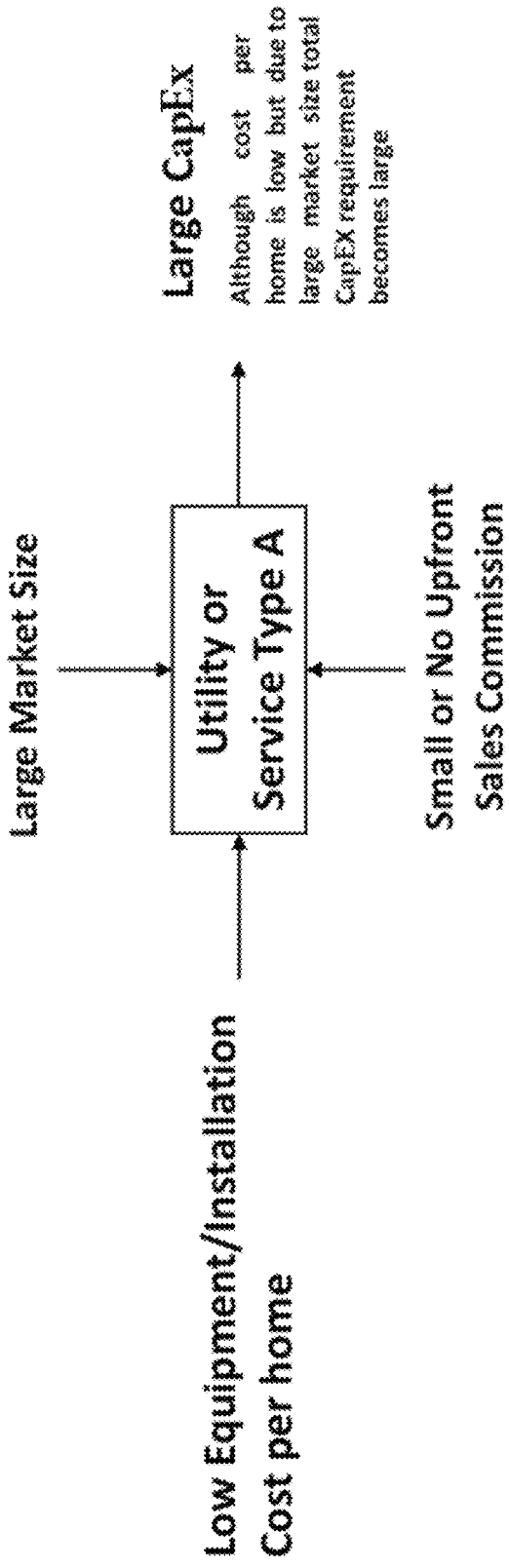
FIG. 1 depicts an example diagram relating to a first type of service in accordance with various aspects of this disclosure.

As one example to illustrate, FIG. 1 defines a first type of private service referred to as private service type A. As shown, private service type A may be characterized as having a very large market size (e.g., typically at least 80% of possible households, although this range could vary), which generally translates to a relatively easy sale. Additionally, service type A may be characterized as having small or no upfront sales commission or cost (referred to herein collectively using the term "sales commission" for simplicity) (e.g., typically less than $100, although this range could vary). Additionally yet, service type A may be characterized as having low equipment and installation cost (referred to herein collectively using the term "onboarding cost" for simplicity) (e.g., typically less than $2,000, although this range could vary). Service type A may have other defining characteristics as well.

Service type A may take any of various forms. In one embodiment, service type A can be a high-speed internet service provided by an internet service operator (e.g., a high-speed internet service provided to a home). In a preferred embodiment, such a high-speed internet service can be wireless, but such a high-speed internet service can also be wired. In addition, such a wired/wireless high-speed internet service can be based on next generation technology (e.g., 5G/6G/7G+) or it can also be based on 2G/3G/4G LTE wireless technology already widely deployed in the market. For wireless operators providing high-speed internet using 5G or millimeter wave-based technology, a very large number of sites are required to cover a city or metro and hence such an operator is faced with the requirement to generate large volume of funds to meet CapEx requirements. Service type A can also take other forms, including but not limited other forms of services that are different from internet services.

Figure 2:
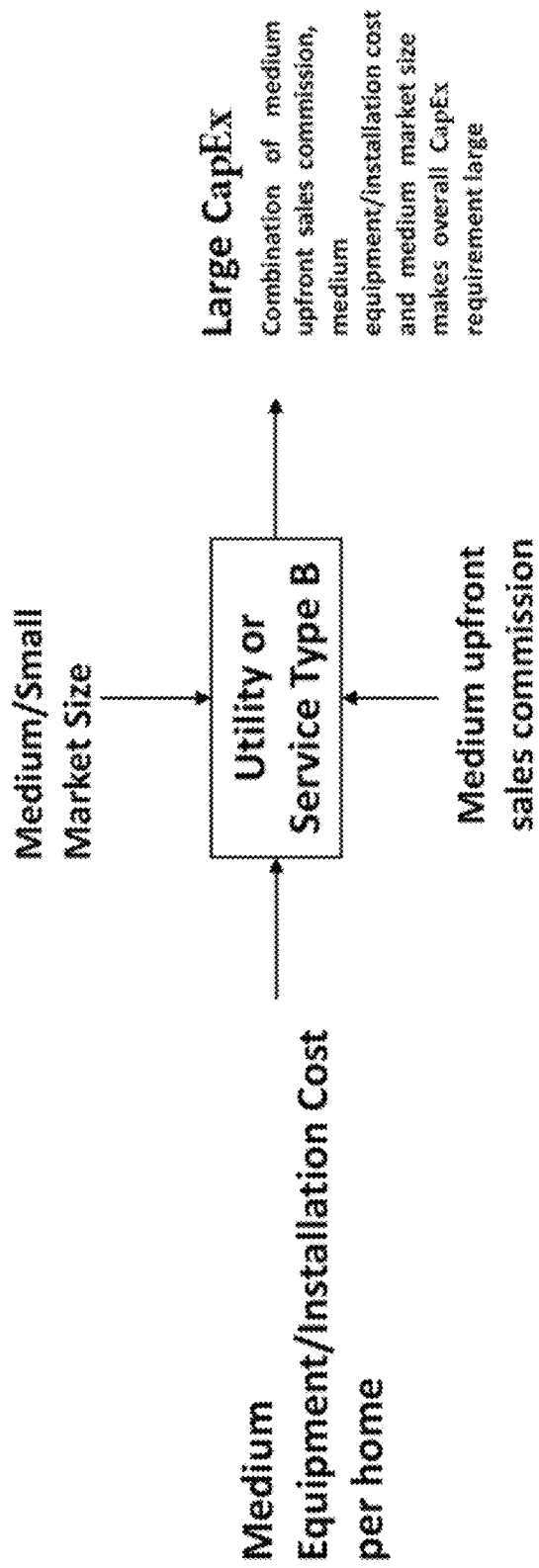
FIG. 2 depicts an example diagram relating to a second type of service in accordance with various aspects of this disclosure.

Turning to FIG. 2, a second type of private service type is defined that is referred to as a private service type B. As shown, private service type B may be characterized as having a medium market size (e.g., typically at least 20% of possible households and perhaps ranging up to 40-50% of possible households, although this range could vary), which generally translates to a moderately difficult sale. Additionally, service type B may be characterized as having a moderate upfront sales commission (e.g., typically between $100 and $500, although this range could vary). Additionally yet, service type B may be characterized as having moderate onboarding cost (e.g., typically between $2,000 and $6,000, although this range could vary). Service type B may have other defining characteristics as well.

Service type B may take any of various forms. In one embodiment, service type B can be a home security service (e.g., a smart home) provided by a home security service provider. In a preferred embodiment, high-speed internet may be required to take full advantage of a home security service, such as monitoring a security camera over a smart phone remotely or getting security alerts in real time. Despite typically having a moderate upfront sales commission, home security services are typically considered to be a moderately difficult sale given that the market size is usually not as large as a high-speed internet service. Service type B may take various other forms as well.

Figure 3:
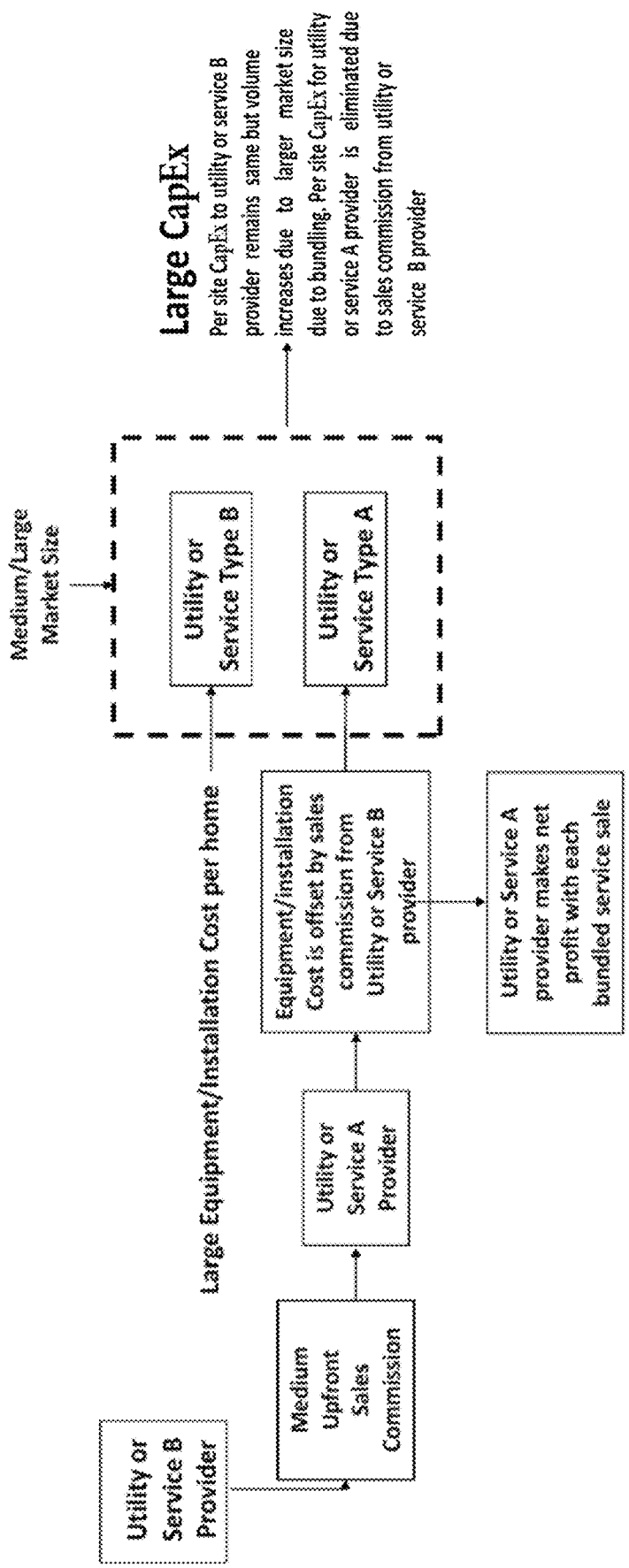
FIG. 3 depicts an example method relating to bundling of the first and second types of services, in accordance with various aspects of this disclosure.

In accordance with the present disclosure, private service type A and private service type B may be bundled together. FIG. 3 illustrates an example method for bundling private service type A and private service type B. As shown, instead of a provider of service type B paying upfront sales commission to its own sales representative, an upfront commission may be provided to a service type A provider. Generally speaking, an upfront commission paid to service type A provider may cover various costs. For instance, such an upfront commission may comprise one or more of onboarding costs and/or monthly operating costs per customer of the private service type A operator. The upfront commission paid to service type A provider may also comprise a different amount than one or more of the costs mentioned above.

In return, as further shown, the provider of service type A may sell to an end customer (e.g., a single-family home owner) a bundled service at a discounted rate by passing on a portion of the upfront commission received from the provider of service type B. Such a strategy of offering service type A at a highly discounted rate may increase the sales volume of the bundled service compared to the sales volume of service type A or service type B alone.

In one preferred embodiment, service type A can be a high-speed internet service described earlier with respect to FIG. 1, and service type B can be a home security service described with respect to FIG. 2. In this context, a high-speed internet service provider can use a portion of the upfront commission received from a home security provider to fund the operation and expansion of its communication network (e.g., a 5G communication network). Meanwhile, a home security provider can take advantage of larger sales volume from the bundled service in comparison to the moderate sales volume of home security sales alone.

It should be understood that service type A and service type B can take various other forms, including but not limited to being services other than high-speed internet and home security (respectively) and/or services characterized as having other ranges of market sizes, sales commission, and/or onboarding costs. Further, it should be understood that private home services other than those having the characteristics of service type A and service type B may be bundled together in the manner described herein.

Figure 4:
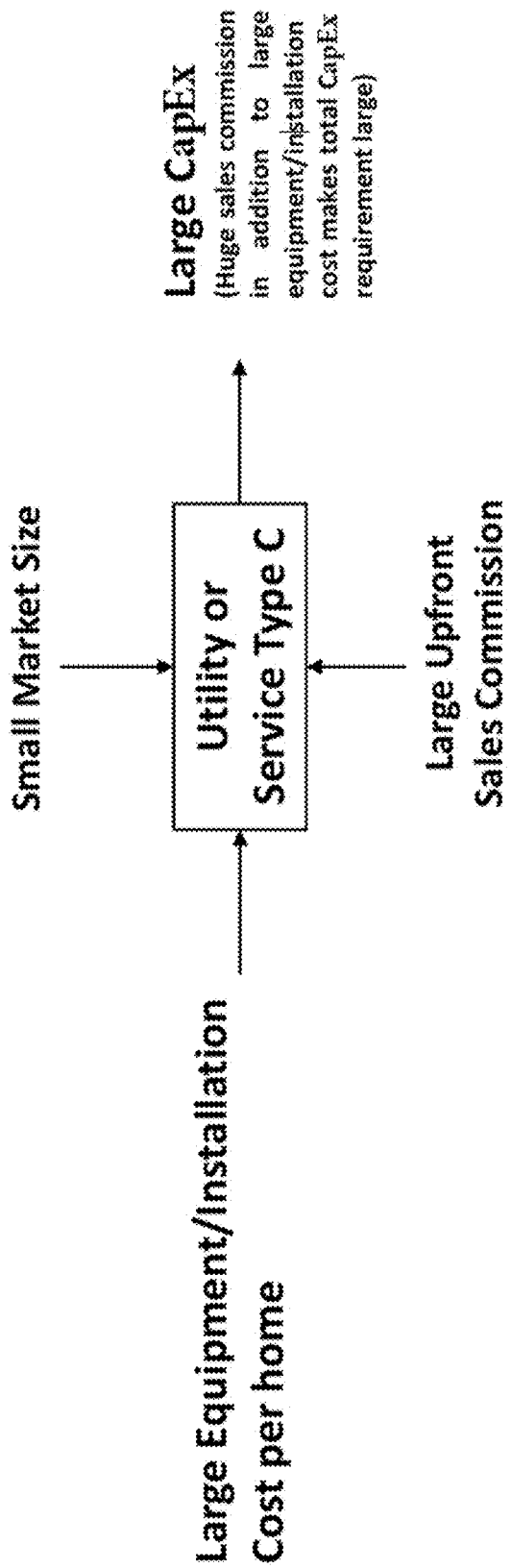
FIG. 4 depicts an example diagram relating to a third type of service in accordance with various aspects of this disclosure.

Turning to FIG. 4, a third type of private service is defined that is referred to as service type C. As shown, service type C is characterized as having a small market size (e.g., typically less than 20% of possible households, although this range could vary), which generally translates to very difficult sales. Additionally, service type C may be characterized as having a large upfront sales commission (e.g., typically more than $500 and perhaps ranging as high as $5000, although this range could vary). Additionally yet, service type C may be characterized as having very high onboarding costs (e.g., typically more than $20,000 and perhaps ranging as high as $100,000, although this range could vary). Service type C may have other defining characteristics as well Service type C may take any of various forms. In one embodiment, service type C may comprise a solar energy service provided by a solar energy service provider. Despite typically having a very high sales commission, home solar energy services are typically considered to be very difficult sales given that the market size is very small compared to other services (e.g., high-speed internet service). Accordingly, private service type C may be bundled with another private service.

Figure 5:
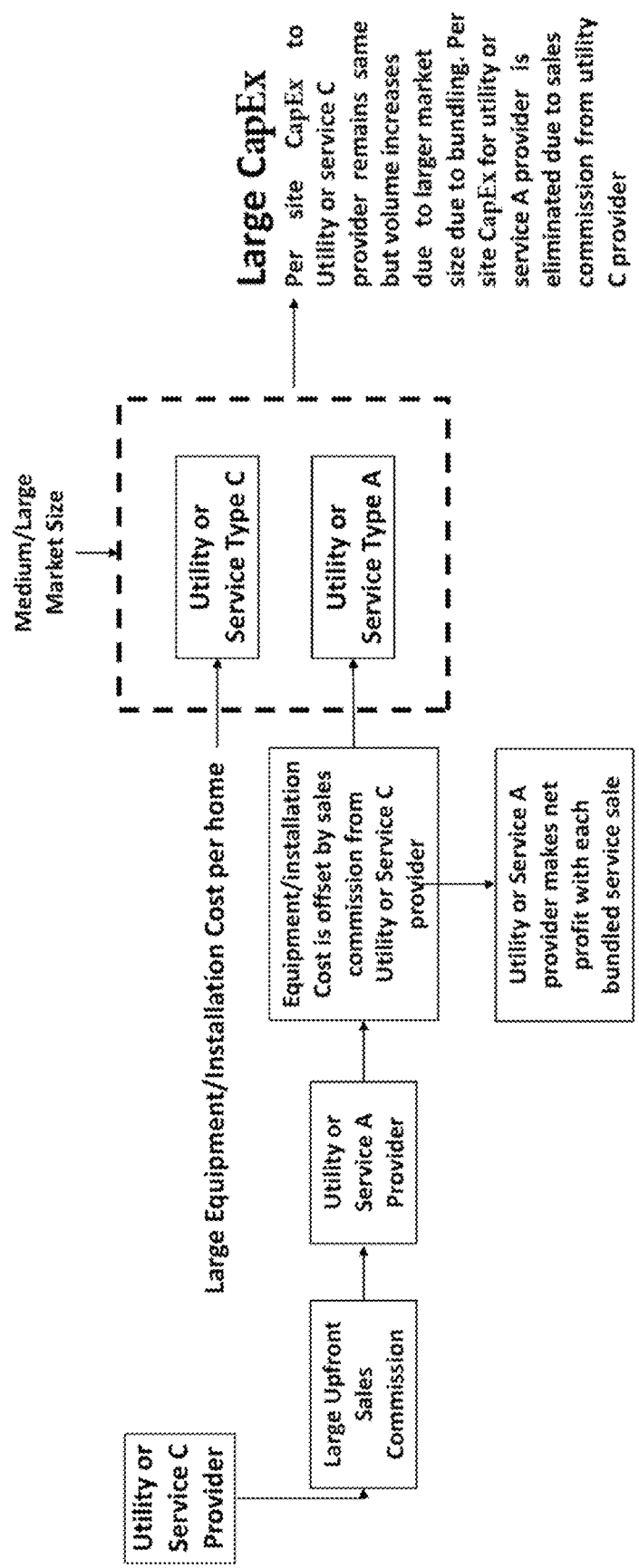
FIG. 5 depicts an example method relating to bundling of the first and third types of services, in accordance with various aspects of this disclosure.

As one example to illustrate, FIG. 5 depicts an example method for bundling private service type A and private service type C. As shown, instead of a provider of service type C paying upfront sales commission to its own sales representative, an upfront commission may be provided to a service type A provider. As mentioned above, the upfront commission paid to service type A provider may cover various costs. For instance, such an upfront commission may comprise one or more of onboarding costs and/or monthly operating costs per customer of the private service type A provider. The upfront sales commission paid to service type A provider may also comprise a different amount than one or more of the costs mentioned above.

In return, as further shown, the provider of private service type A may sell to an end customer (e.g., a single-family homeowner) a bundled service at a discounted rate by passing on a portion of the upfront commission received from the provider of private service type C. Such a strategy of offering private service type A at a highly discounted rate (or free for a given duration) may increase the sales volume of the bundled service compared to the sales volume of private service type C or service type A alone.

In one preferred embodiment, private service type A can be a high-speed internet service described earlier with respect to FIG. 1, and service type C can be a home solar energy service described with respect to FIG. 4. In this context, a high-speed internet service provider may use a portion of the upfront commission received from a home security provider to fund the operation and expansion of its communication network (e.g., 5G communication network). Meanwhile, a home solar energy provider may take advantage of larger sales volume resulting from the bundled service (in comparison to the sales volume of home solar energy sales alone).

It should be understood that private service type A and private service type C can take various other forms, including but not limited to being services other than a high speed internet service and home solar service (respectively) and/or services characterized as having other ranges of market sizes, sales commission, and/or onboarding costs. Further, it should be understood that private home services other than those having the characteristics of service type A and service type C may be bundled together in the manner described herein.

While the foregoing methods have been described in the context of bundling a first type of private service type (e.g., high-speed internet service using 5G technology) with one other type of private service type, it should be understood that a first type of private service can be bundled with multiple other types of private services, such as multiple private type B services, multiple private type C services, or a combination of multiple private type B and type C services. For instance, one market can be served with a combination of type A, type B and/or type C private services and another market can be served by a different combination of type A, type B and/or type C private services.

Further, it should be understood that the methods described above may be facilitated at least in part by computing systems associated with the providers of the private services. In this respect, each such computing system may comprise one or more processors, data storage, and program instructions that are executable to cause the computing systems to carry out some or all of the functions described above.

As discussed above, one type of infrastructure that may be deployed in accordance with the present disclosure may take the form of a next generation communication network, such as a 5G communication network. In this respect, such a 5G communication network may take any of various forms.

As one possibility, a 5G communication network deployed in accordance with the present disclosure may include a plurality of wireless mesh network nodes, at least some of which comprise blockchain nodes that each hosts a computer comprising one or more processors, memory, digital content, software, etc. The computer may be coupled to a blockchain network using a client that performs the task of storing, validating and/or relaying transactions in addition to providing high-speed internet service capability as described above. In this respect, a 5G communication network (e.g., wireless/wired mesh network, cellular network, etc.) and its nodes may provide an ideal platform for blockchain databases, enterprise blockchain databases, permissioned/private blockchains, hybrid and other similar types of databases (or other instances of file/data/record storage space) that are distributed as wireless mesh network nodes across a geographical coverage area, along with blockchain-based digital cryptocurrency mining including cloud mining, pool mining services—in addition to internet services. The revenue generated from these blockchain platform-based services by the distributed nodes of the 5G communication network can be used to provide price subsidies to the existing internet service customers and or can be used to extend the 5G communication network by adding additional nodes.

In some implementations, one or more of the wireless mesh network nodes of a 5G communication network may each act as a blockchain-based distributed data storage node by adding dedicated or shared storage capacity capability to the node. One advantage of implementing blockchain distributed data storage on a 5G communication system and its wireless mesh network nodes is that storage nodes are inherently distributed, the wireless communication links between wireless mesh network nodes typically have low latency and high bandwidth, and the storage location nodes are typically more proximate to the end-user, which may allow data content to be accessed faster as compared to other approaches.

Figure 6:
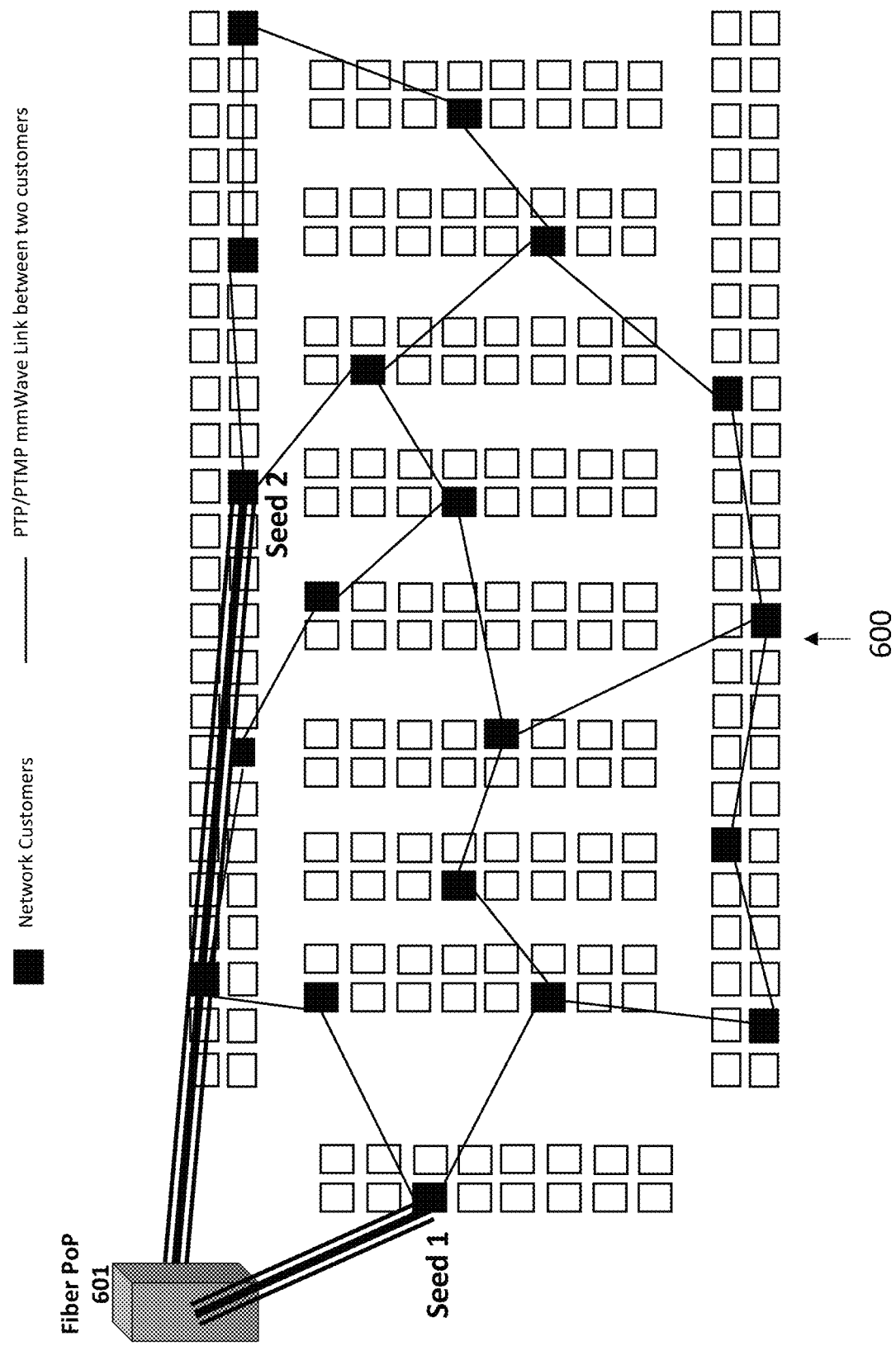
FIG. 6 depicts an example 5G communication network deployed in accordance with various aspects of this disclosure.

Referring to FIG. 6, an example 5G communication network 600 comprising wireless mesh network nodes is illustrated. As shown, the small black squares in FIG. 6 represent the wireless mesh network nodes of example 5G communication network 600. Each wireless mesh network node of example 5G communication network 600 may host wireless communication network equipment for establishing point-to-point or point-to-multi-point bi-directional links, and may also comprise blockchain platform-based capabilities described above by hosting additional hardware and software. Generally speaking, the revenue from these blockchain platform-based services can be used to provide pricing subsidies to existing customers and/or to expand example 5G communication network 600 through the addition of new nodes.

Figure 7:
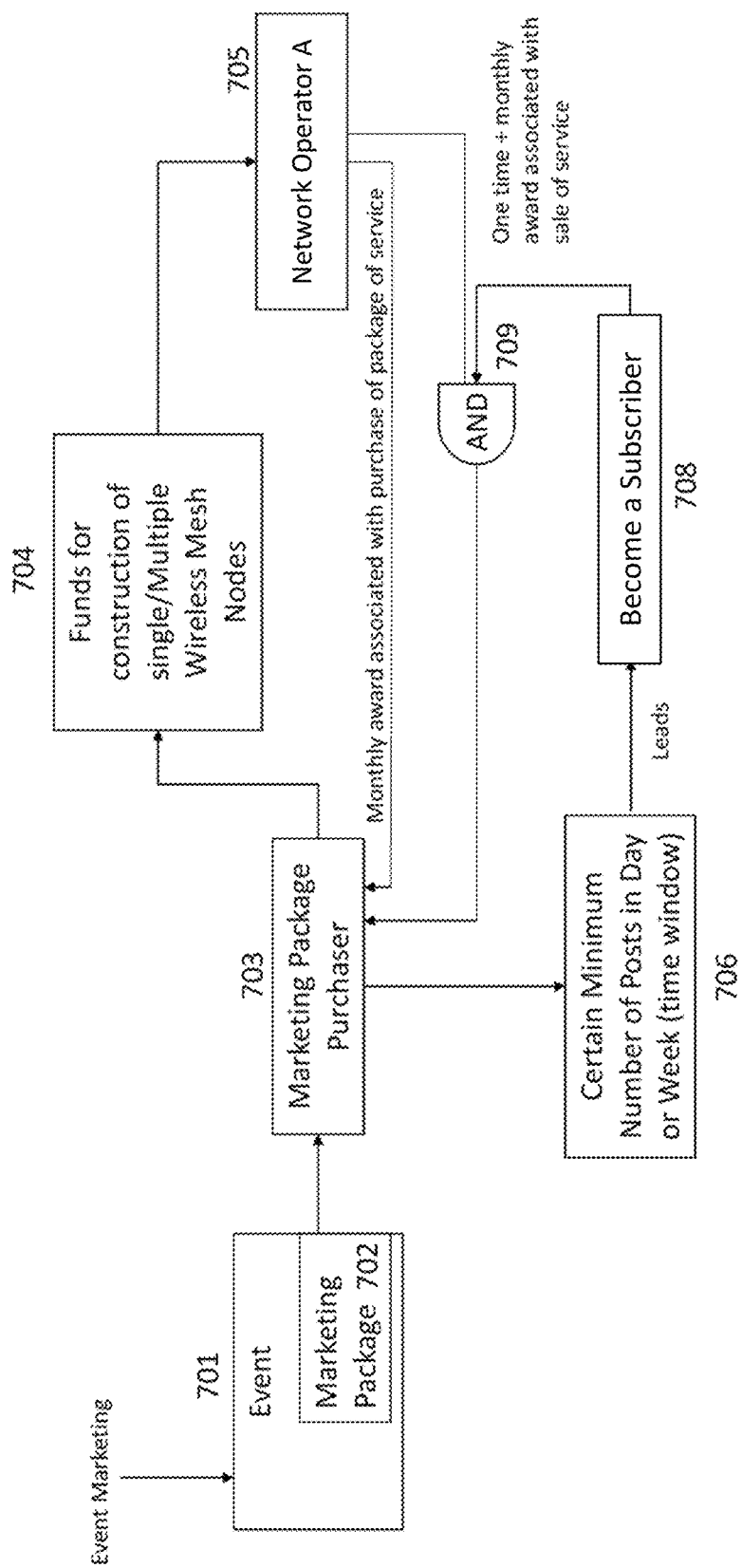
FIG. 7 depicts designs illustrating example methods relating to and in accordance with various aspects of this disclosure.

In accordance with the present disclosure, a funding strategy for deploying a private service may take various other forms. To illustrate, FIG. 7 depicts a type of funding method based on social marketing for an event 701. Event 701 may take various forms, examples of which may include an invitation-only-based private event, an RSVP-based private event, or a public event, among other types of event (e.g., a traditional event where people attend in person or a virtual online event).

Further, event marketing for event 701 may take various forms, examples of which may include marketing based on mail, radio/tv advertisement, online advertisement, targeted online search engine optimization, social media-based and influencer marketing approaches. During event 701, an overview of certain marketing techniques (e.g., online/social media marketing, influencer marketing) may be given to an audience for marketing network services and a detailed marketing package 702 may be offered at a certain price. Marketing package 702 may take various forms, such as educational/training material for providing online and/or social media/influencer marketing for internet services provided by network operator A 705 (and/or other products or services).

Further yet, marketing package 702 may be offered at varying costs. As one example, the cost of marketing package 702 may be equal to the cost of building (e.g., equipment and installation costs) and/or operating one or more wireless mesh nodes of a communication network provided by network operator A 705. As another example, the cost of marketing package 702 may be equal to the cost of building (e.g., equipment and installation costs) and/or operating one or more wireless mesh nodes of a communication network provided by network operator A 705 in addition to a portion of the cost of event 701. It should be understood that marketing package 702 may be offered at different costs as well (e.g., at a cost higher or lower than the cost of building and/or operating one or more wireless mesh network nodes of a communication network provided by network operator A 705).

As further shown in FIG. 7, during a marketing package purchaser phase 703, an attendee of event 701 may purchase marketing package 702 by paying the cost of marketing package 702 to network operator A 705 and/or an organizer of event 701. At phase 704, the funds from the sales of marketing package 702 may then be received by network operator A 705.

In some instances, depending on the marketing package price, the purchaser of marketing package 702 at phase 703 may become a virtual owner of one or more nodes of the communication network provided by network operator A 705. Additionally, marketing package purchaser may get a guaranteed monthly reward and/or compensation as being a virtual owner of the wireless mesh network node or nodes. This is illustrated in FIG. 7 by an arrow originating from network operator A 705 to the marketing package purchaser at phase 703.

In one particular example, the guaranteed monthly compensation for the marketing package purchaser may be $50 per node sponsored/owned. It should be understood that the guaranteed monthly compensation can be a different amount as well (e.g., an amount higher or lower than $50 per node).

In another example, the guaranteed monthly compensation for the marketing package purchaser may depend on phase 706, where the marketing package purchaser may be required to post a certain number of messages on a social media/online or an influencer-based marketing platform for a given duration (e.g., every day, every week, every pre-agreed time interval, etc.) to be eligible for the guaranteed monthly compensation. Generally speaking, these messages that are posted at phase 706 may generate leads to potential customers who may become subscribers of an internet service provided by network operator A 705. Each time a lead generated by a post at phase 706 of a marketing package purchaser becomes a subscriber of an internet service provided by network operator A 705, the marketing package purchaser may receive a one-time compensation and perhaps a small monthly residual compensation as shown by the AND gate in FIG. 7, which takes input from both wireless operator A 705 and input 709 and compensation is only awarded in case both input conditions are true.

In one embodiment, the one-time compensation for a lead that becomes an internet service subscriber of operator A 705 and the monthly residual compensation associated to this sale of service can be $100 and $1/month, respectively. It should be understood that the value of the one-time compensation and/or monthly residual compensation may vary as well (e.g., an amount lower or higher than $100 and $1/month, respectively).

In turn, the revenue generated may be used to (1) fund the expansion of a communication network by adding new wireless mesh nodes and/or (2) support operations of existing nodes of the communication network.

It should be understood that FIG. 7 depicts one example of a social marketing-based approach for generating funding for building the infrastructure for a next generation communication network (a 5G/6G/7G+ communication network). In other examples, additional phases or a subset of the phases in FIG. 7 may be used for generating funding for building the infrastructure for a next generation communication. Further, in other examples, the phases in FIG. 7 may interconnect with other phases in a manner different than FIG. 7.

In some implementations, various methods and approaches described above can be combined to form hybrid strategies for generating funding for building infrastructure for a next generation communication network (a 5G/6G/7G+ communication network). For example, a type A private service can be bundled with type B and/or type C private services to generate funding in addition to revenue from blockchain platform-based services and funding generated by marketing events discussed above with respect to FIG. 7. As another example, a subset of the above revenue sources can be utilized in parallel for generating funding for building the infrastructure and operations of a next generation communication network (a 5G/6G/7G+ communication network) for providing high-speed internet. As yet another example, a subset of the above revenue sources can be utilized in parallel for generating funding for building the infrastructure and operations of a next generation communication network (a 5G/6G/7G+ communication network) for providing high-speed internet in addition to one or more other funding sources.

Further, in some embodiments, wireless mesh network node equipment (e.g., point-to-point link modules, point-to-multipoint link modules, multiple point-to-point link modules, a combination of multiple point-to-point and point-to-multipoint links, antennas for cellular small cells/CPEs and mmWave equipment, cable, mounts, power supply boxes, etc.) that gets deployed and installed on private property, such as a rooftop of a single-family home, can be consumer financed.

For instance, if a customer meets a certain credit score threshold (or any other financial criteria), equipment required to add a millimeter-wave mesh node at the customer's premises to add the customer to a wireless mesh network and provide high-speed internet service may be financed by a bank on behalf of the customer, and the customer may agree with the bank to repay the amount financed by the bank over a certain time period (e.g., by making periodic payments based on the terms and conditions of the agreement). In this respect, the customer may become the owner of the equipment (e.g., a wireless mesh network node) once the full financed amount is paid back to the bank. In some instances, the customer may then lease back the wireless mesh network node equipment installed on the customer's property to the network operator that installed the wireless mesh network equipment and provide high-speed internet data service, either indefinitely or for a certain term. (e.g., 24 months, 36 months, or 18 months, etc.).

In other instances, the customer may lease the equipment to a network operator other than the one who originally installed the equipment on the customer's property, which may take place with or without the permission of the network operator who originally installed the equipment on the customer's property and/or after expiration of a lease term with the original network operator.

For a network operator building and operating a communication network, the customer financing-based network deployment may become a crowd sourcing or crowdfunding-based infrastructure roll-out mechanism where, instead of one or more large entities, CapEx is sourced from a pool of individuals (e.g., customers of the network operator). In such a scenario, customers may get high-speed internet data service from the network operator (operating using ptp/ptmp modules, other communication nodes and equipment) at a subsidized/discounted rate.

In embodiments where the wireless mesh network node equipment is consumer financed, such customers either may get two separate bills periodically—one for the high-speed internet data service and other for the equipment financing from a bank—or may get a single consolidated bill from the wireless mesh operator.

Further, in embodiments where the wireless mesh network node equipment is consumer financed, it is possible that all customers of the network operator can be based on consumer financing (as described above) in a neighborhood or market where the network operator offers its high-speed internet data service.

In other embodiments, wireless mesh network node equipment can be based on other financing approaches. For example, wireless mesh network node equipment may be based on operator financing where a network operator pays for wireless mesh node equipment that is financed through bundling a private service that has a relatively smaller market size (e.g., home security/automation, solar energy, etc.) with a private service that has a large market size (e.g., high-speed internet), and where the network operator uses the commission received from a private service provider to fund the wireless mesh node equipment. As another example wireless mesh network node equipment may be financed through the revenue generated from running blockchain platform-based services on wireless mesh network nodes along with consumer/customer-based financing described above. Other examples are possible as well.

Further, in still other embodiments, existing customers of a network operator can be incentivized to do various types of marketing for the network operator. For instance, as one possibility, a customer may post on social media (e.g., Facebook, WhatsApp, WeChat, QZone, Tumblr, Instagram, Twitter, etc.) a link to the network operator's website to subscribe to an internet data service. If a potential customer who accesses the link ends up subscribing to the internet data service offered by the network operator, the customer who posted the link may receive compensation, which may take various forms.

As one example, the customer who posted the link may receive a subsidy in the form of a reduced monthly bill for an internet data service. As another example, the customer who posted the link may receive an upgrade to a higher internet data speed package without any change in the customer's existing price plan. As yet another example, the customer who posted the link may receive a reduction in fees (e.g., early termination fees, etc.). One or ordinary skill in the art will appreciate that customer who posted the link may receive other types of compensation as well and perhaps receive a combination of the types of compensation described above.

Customers of a network operator can be incentivized to do various other types of marketing for the network operator as well. For instance, as one possibility, a customer of a network operator may contact his/her neighbors who are not a current subscriber of an internet data service offered by the network operator and encourage each neighbor to subscribe to the internet data service. If a neighbor ends up subscribing to the internet data service offered by the network operator as a result of the contact made by the customer, the customer who contacted the neighbor may receive compensation, which may take various forms described above.

As another possibility, the neighbor may be a next-door neighbor of the customer, and thus, the internet data service may be provided to the neighbor by running a cable from the radios deployed on the customer's house to the modem/router of the next-door neighbor. In this respect, no wireless radio equipment may be required, and in such cases, a higher level of compensation may be provided to the customer.

Example embodiments of the disclosed innovations have been described above. Those skilled in the art will understand, however, that changes and modifications may be made to the embodiments described without departing from the true scope and spirit of the present invention, which will be defined by claims.

Further, to the extent that examples described herein involve operations performed or initiated by actors, such as humans, operators, users or other entities, this is for purposes of example and explanation only. Claims should not be construed as requiring action by such actors unless explicitly recited in claim language.

What is claimed is:

1. A next generation communication system comprising:
a set of network nodes that are each equipped with hardware and software that configures the network node to connect to and operate within a wireless mesh network for providing high-speed Internet service, wherein:
   each network node in the wireless mesh network is configured to communicate with at least one other network node in the wireless mesh network via a wireless, bidirectional communication link; and
   each network node in a subset of the set of network nodes is further equipped with hardware and software that configures the network node to act as a blockchain-based distributed data storage node within a blockchain network that is configured to provide blockchain-based services.

2. The next generation communication system of claim 1, wherein the hardware and software that configures each network node in the subset of the set of network nodes to act as a blockchain-based distributed data storage node within a blockchain network comprises a computer that includes one or more processors, memory, digital content, and software for facilitating blockchain-based services.

3. The next generation communication system of claim 2, wherein the software for facilitating blockchain-based services comprises a client for storing, validating, and relaying blockchain-based transactions.

4. The next generation communication system of claim 1, wherein the blockchain-based services comprise at least one of a service for blockchain-based distributed data storage or a service for blockchain-based digital cryptocurrency mining.

5. The next generation communication system of claim 1, wherein the next generation communication system is one of a 5G, a 6G, or a 7G communication system that comprises the wireless mesh network for providing the high-speed Internet service.

6. The next generation communication system of claim 5, wherein revenue generated from providing the blockchain-based services via the subset of the set of network nodes is used to provide pricing subsidies to customers of the high-speed Internet service.

7. The next generation communication system of claim 5, wherein revenue generated from providing blockchain-based services via the subset of the set of network nodes is used to expand the 5G, 6G, or 7G communication system.

8. The next generation communication system of claim 1, wherein the hardware and software that configures each network node in the wireless mesh network to connect to and operate within the wireless mesh network for providing high-speed Internet service comprises:
   equipment for establishing and communicating over one or more wireless, millimeter-wave bidirectional communication links.

9. The next generation communication system of claim 8, wherein the equipment for establishing and communicating over the one or more wireless, millimeter-wave bidirectional communication links comprises one or more millimeter-wave antennas.

10. The next generation communication system of claim 8, wherein the one or more wireless, bidirectional millimeter-wave communication links comprises one or both of (i) a wireless, bidirectional point-to-point millimeter-wave communication link or (ii) a wireless, bidirectional point-to-multipoint millimeter-wave communication link.

11. The next generation communication system of claim 1, wherein each network node in the set of network nodes is installed at a fixed location on private property of a respective customer of the high-speed Internet service.

12. The next generation communication system of claim 11, wherein the fixed location on private property of the respective customer of the high-speed Internet service comprises a rooftop of the respective customer's home.

13. A network node comprising:
a first set of hardware and software that configures the network node to connect to and operate within a wireless mesh network for providing high-speed Internet service such that the network node is configured to communicate with at least one other network node in the wireless mesh network via a bidirectional wireless communication link; and
a second set of hardware and software that further configures the network node to act as a blockchain-based distributed data storage node within a blockchain network that is configured to provide blockchain-based services.

14. The network node of claim 13, wherein the second set of hardware and software that further configures the network node to act as a blockchain-based distributed data storage node within a blockchain network comprises a computer that includes one or more processors, memory, digital content, and software for facilitating blockchain-based services.

15. The network node of claim 14, wherein the software for facilitating blockchain-based services comprises a client for storing, validating, and relaying blockchain-based transactions.

16. The network node of claim 15, wherein the one or more wireless, bidirectional millimeter-wave communication links comprises one or both of (i) a wireless, bidirectional point-to-point millimeter-wave communication link or (ii) a wireless, bidirectional point-to-multipoint millimeter-wave communication link.

17. The network node of claim 13, wherein the first set of hardware that configures the network node to connect to and operate within the wireless mesh network for providing high-speed Internet service comprises:
   equipment for establishing and communicating over one or more wireless, millimeter-wave bidirectional communication links.

18. The network node of claim 13, wherein the network node is installed at a fixed location on private property of a respective customer of the high-speed Internet service.

19. The network node of claim 13, wherein the fixed location on private property of the respective customer of the high-speed Internet service comprises a rooftop of the respective customer's home.

* * * * *